E. S. HUTTON.
MACHINE FOR MAKING HOLLOW GLASSWARE.
APPLICATION FILED SEPT. 16, 1915.

1,241,516.

Patented Oct. 2, 1917.
10 SHEETS—SHEET 1.

Fig. 1.

WITNESSES:
J. H. Swan
J. H. Wells

INVENTOR
Edward S. Hutton
BY
Lockwood & Lockwood
ATTORNEYS

E. S. HUTTON.
MACHINE FOR MAKING HOLLOW GLASSWARE.
APPLICATION FILED SEPT. 16, 1915.

1,241,516.

Patented Oct. 2, 1917.
10 SHEETS—SHEET 4.

Fig. 4.

WITNESSES:

INVENTOR
Edward S. Hutton

BY
ATTORNEYS.

UNITED STATES PATENT OFFICE.

EDWARD S. HUTTON, OF LAPEL, INDIANA.

MACHINE FOR MAKING HOLLOW GLASSWARE.

1,241,516.　　　　Specification of Letters Patent.　　Patented Oct. 2, 1917.

Application filed September 16, 1915. Serial No. 51,108.

*To all whom it may concern:*

Be it known that I, EDWARD S. HUTTON, a citizen of the United States, and a resident of Lapel, county of Madison, and State of Indiana, have invented a certain new and useful Machine for Making Hollow Glassware; and I do hereby declare that the following is a full, clear, and exact description thereof, reference being had to the accompanying drawings, in which like letters refer to like parts.

The object of this invention is to improve the construction of machines for making hollow glassware and improve the operation of such machines, for automatically performing all steps in the operation of pressing the glass in the blank mold, transferring the same to the blow mold and blowing the glass in the blow mold for completing the article, the machine being a continuously operative one.

One feature of the invention consists in providing molds formed of two totally separate vertical sections and mounting and operating them so that said vertical sections will be moved against each other for closing the mold and away from each other for opening the mold. Also the lift-over means for transferring the blank from the press mold to the blow mold adapted to move the blank laterally from one mold into the other without lifting it above said molds, that is, by moving the blank laterally between the sections of the molds.

Another feature of the invention consists in lift-over means for transferring the blank which enters the mouth of the blank and engages the inner surface thereof for supporting the same instead of the outer surface, as heretofore.

Along with the foregoing is the further feature of invention of pressing the blank in inverted position and then uprighting the press mold after the blank has been pressed and thereafter transferring the blank to the blow mold position and lowering it into the blow mold.

Another feature of the invention consists in the means for mounting the sections of the blow mold in the rotary table of the machine so that the sections would be automatically brought together and separated at the right times in coöperation with the blow head and bottom of the mold and also for turning the press mold a half revolution in its mounting and inverting the press mold for revolving the glass and pressing the same and afterward uprighting the same preliminary to the transfer of blank and mold to the blowing position.

Another feature of the invention consists in mounting in connection with the table a press mold and a blow mold and providing a blow head and a bottom suitable for both of said molds and adapted to be used first with a blank mold and thereafter with the blow mold.

Another feature of the invention consists in the cut-off mechanism in combination with the constantly moving table, or, at least, in the arrangement wherein the press mold, into which the gather may be introduced, moves during the cut-off.

The full nature of the invention will be understood from the accompanying drawings and the following description and claims.

Figure 1:
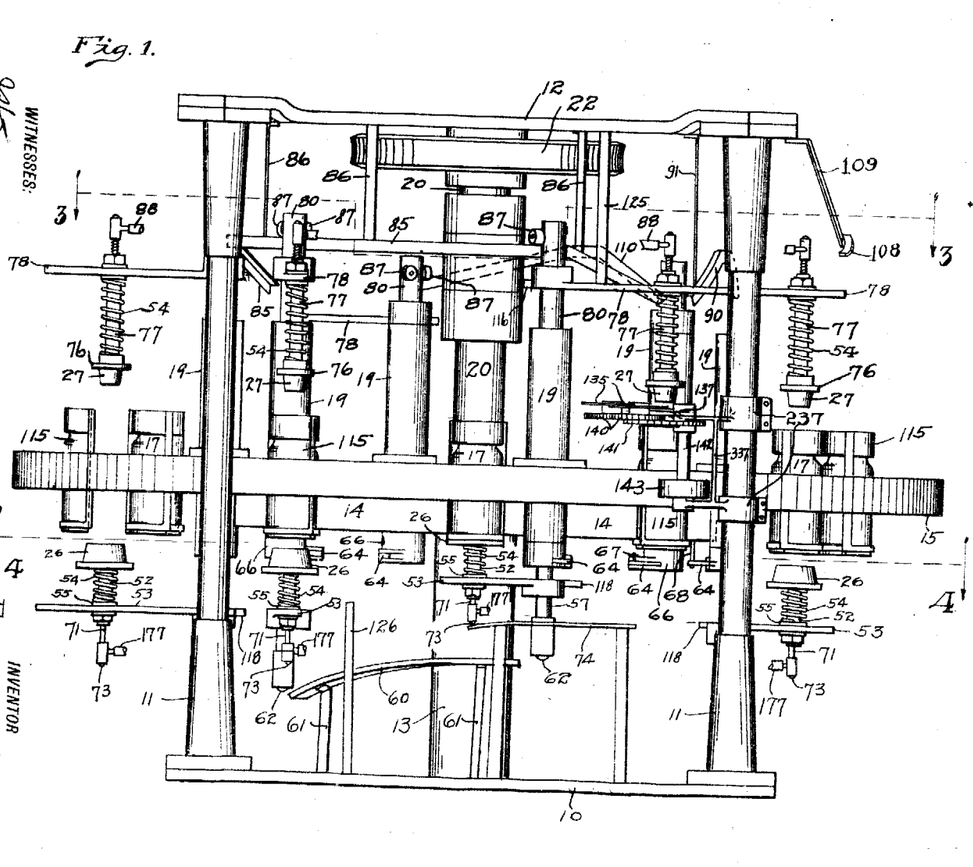
Figure 1 is a side elevation of said machine with the press mold in position for a gather of glass.

*General arrangement.*—There is shown in Fig. 1 a base 10 having four rigid uprights 11 with a top frame 12 secured on the upper ends thereof so that the parts 10, 11 and 12 constitute a rigid frame. The uprights 11 may be formed of three pieces, as shown, but they are rigid when assembled. The top frame 12 is a skeleton frame having the form shown in Fig. 20. There is also a table support rigid with said frame, said table support consisting of a tubular column 13 rising centrally from the base 10 and a horizontal circular top frame or plate 14 upon which the table 15 is mounted by means of the intermediate balls 16 operating in suitable races formed in the supporting plate 14 and table 15 so that the table is rotated. The table is centrally secured to a column 20 whereby it is rotated and the table carries the press molds 17, blow molds 115 and columns 19 which carry the means for manipulating and operating the molds. In the machine shown there are six molds of each type and, therefore, six pairs of molds and there is one column 19 for and adjacent each pair of molds. The table also carries other mechanism which will hereafter be explained for operating the press molds.

The table is rotated continuously by the column 20. The lower end of it has bearing in the stationary column 13 and the upper end has bearing in the center of the top frame 12. Said column is turned by a worm gear 22 secured thereon near its upper end and engaged and driven by a worm 23 on a shaft 24 and mounted in bearings 25 secured to the underside of the top frame 12. Said shaft 24 is driven by any suitable means, not shown.

Figure 5:
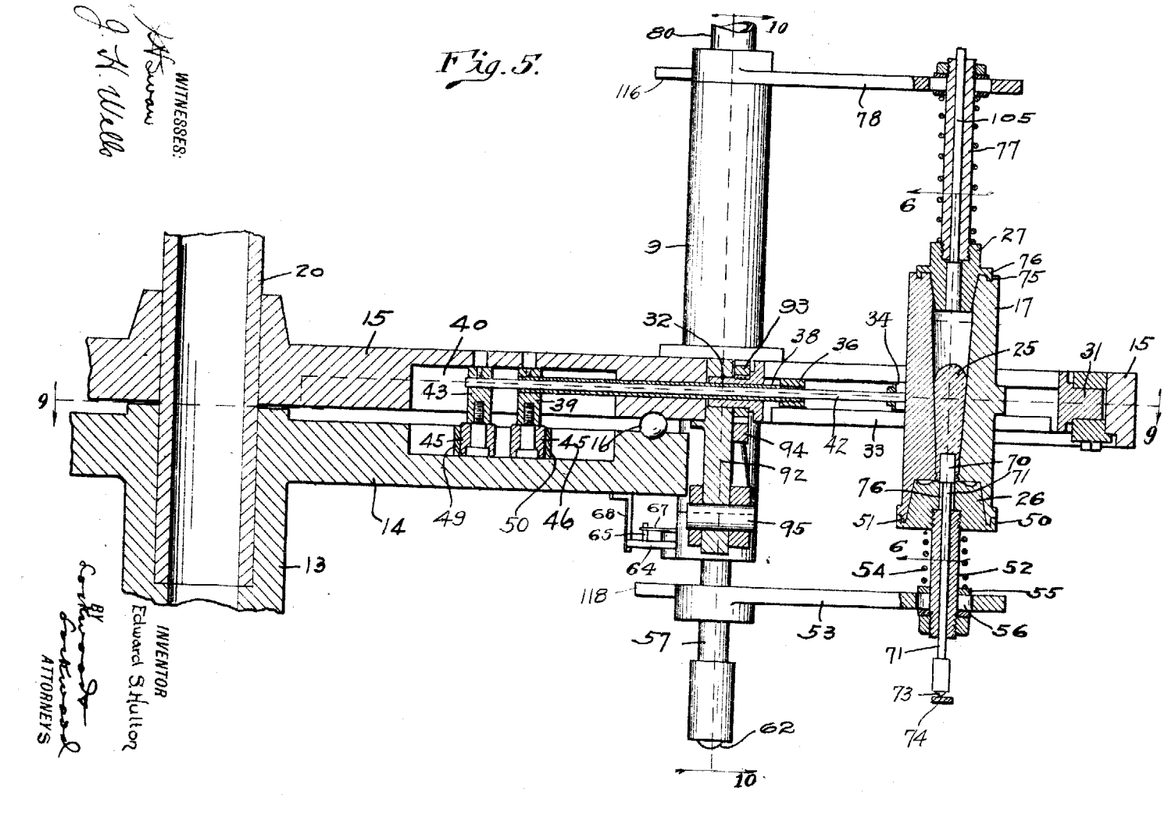
Fig. 5 is a vertical section through a portion of the machine on the line 5—5 of Fig. 3, showing the pressing operation.

*Press molds.*—The press mold 17 is made of two longitudinal sections or halves and when assembled is opened at both ends with a tapering chamber and when the blank is formed the narrow end of the mold chamber is downward for forming the neck of the blank while the enlarged end of the mold chamber is uppermost, as seen in Fig. 5. When the blank 25 is being formed, the lower end of the press mold is inclosed by a bottom 26 and the upper end by a blow head 27, both said bottom and blow head tapering to fit tightly in flaring openings in the ends of the press mold, as shown. The gather of glass is inserted in the upper enlarged end of the press mold.

Figures 6, 7, 8, 23, 24:
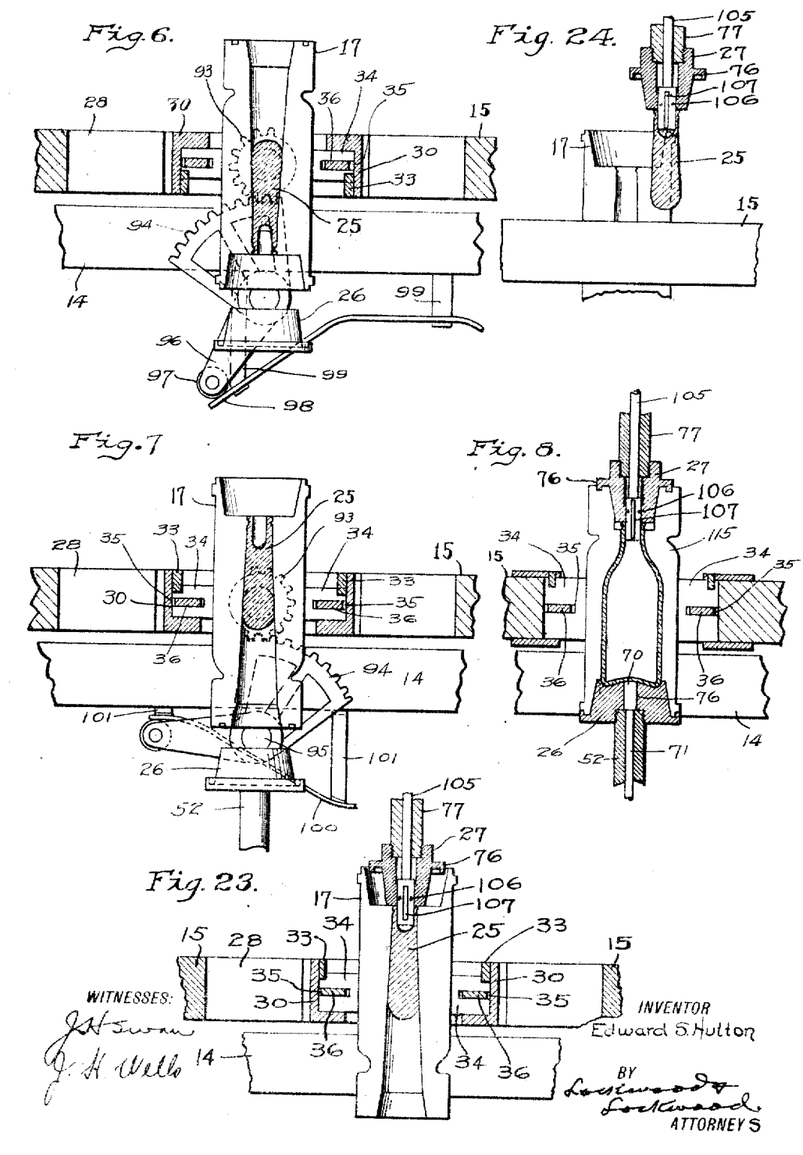
Fig. 6 is a vertical section on the line 6—6 of Fig. 5.
Fig. 7 is the same as Fig. 6 after the press mold has been inverted.
Fig. 8 is a vertical section on the line 8—8 of Fig. 3 through the blow mold.
Fig. 23 is similar to Fig. 7 with the blow head and lift-over in position in the press mold for the lift-over to engage the blank.
Fig. 24 is a side elevation of a portion of the table and the inner section of the press mold partially broken away, and a section of the blow head, lift-over and blank, showing them as the blank is being removed from between the sections of the press mold.
Figure 9:
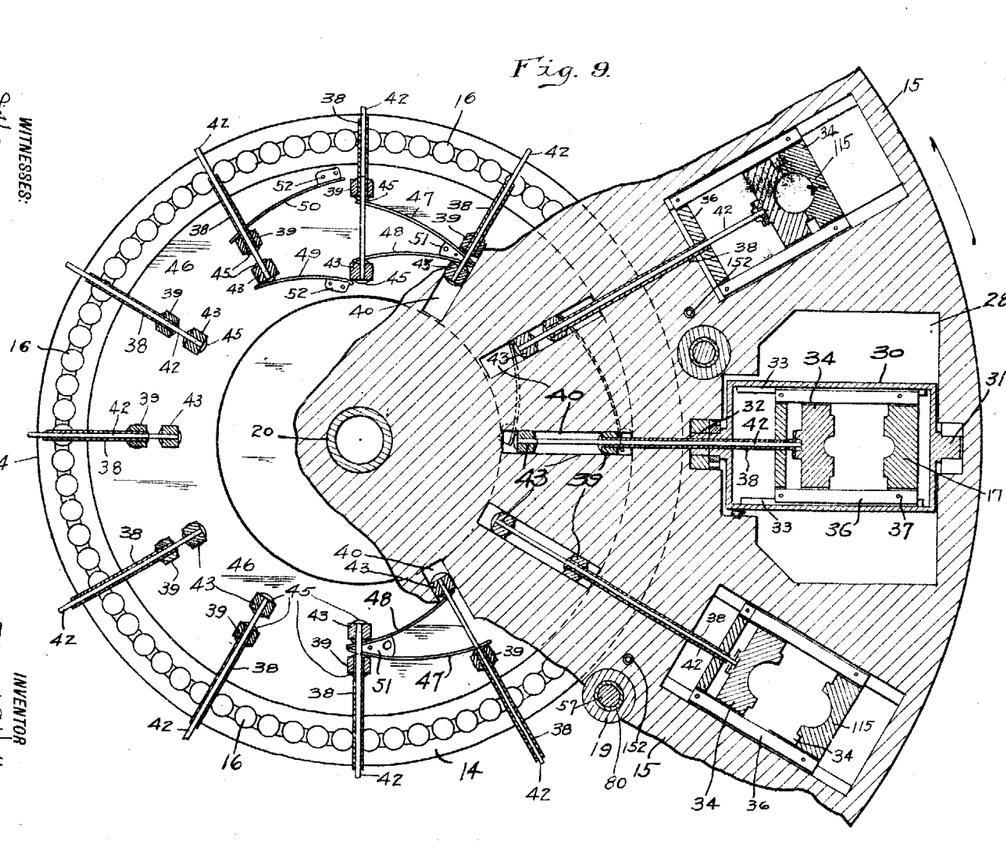
Fig. 9 is a view partially in section and partially in plan through the machine on the line 9—9 of Fig. 5.

The mounting of the press mold is shown best in the central right-hand portion of Fig. 9, where there is a large opening 28 through the table and a rectangular frame 30 narrower than said opening transversely of the table and about the same width as the frame radially of the table and said frame is rotatably mounted by means of trunnions 31 and 32 in said table so that the frame 30 can turn on an axis radially with the table for turning the press mold, as hereafter explained. The form of the frame 30 is shown in Fig. 6 to be the shape of an inverted L. Springs 33 are secured along the lower edge so as to furnish a guideway about midway of said frame for the lateral projections 34 from the section 17 of the press mold. The projections 34 have in them slots 35 into which slots members of a frame 36 extend and are secured by pins 37. Said frame 36 consists of the two side bars, as shown in Fig. 9, and an inner cross bar and is centrally secured to a tube 38 extending radially of the table and having on its inner end a block 39 radially movable in a radial slot 40 in the table, see Figs. 5 and 9. The inner half of the press mold has also lateral extensions 34 slidably mounted in the frame 30 and having slots 35 through which the side bars of the frame 36 can reciprocate without affecting or removing the inner half of the press mold. The inner half of the press mold is secured to a rod 42 which extends through the tube 38 radial of the table and has a block 43 secured on the inner end of it and operating in the slot 40 in the table. Therefore, the outer half of the press mold is reciprocated in the frame 30 by the frame 36, tube 38 and block 39, while the inner half of the press mold is reciprocated in the frame 30 by the rod 42 and block 43. The blocks 39 and 43 are shown in Fig. 5, and they carry rollers 45 on the lower ends thereof which project into an annular recess 46 in the table support 14 and which are actuated or reciprocated by fixed cam springs 47 and 48, and 49 and 50, as shown in Fig. 9, which are secured by means 51 and 52 in said recess 46 on the table support 15. There are two pairs of said springs, one pair 47 and 48 which flare and, therefore, spread the blocks 39 and 43 apart and thus draw the sections of the press mold apart and said pair of springs is immediately succeeded by the parts 49 and 50 which converge and draw said blocks 39 and 43 together to bring and hold the mold sections together, as illustrated in Fig. 9, until the mold sections are locked together by the bottom 26, as seen in Fig. 5, said bottom having an annular flange 50 adapted to surround a flange 51 on the lower end of the press mold.

After the press mold has been moved by the table to the gathering position and the two sections thereof are brought together by the springs, as heretofore explained, the bottom 26 is moved up to the closing position shown in Fig. 5 from the open position shown in Fig. 1. Said bottom is carried on an upright 52 yieldingly mounted on a horizontal arm 53 by means of a spring 54 surrounding the upright 52 and lying between the bottom at the upper end of said upright and a washer 55 resting upon the arm 53. The upright extends through a slot 56 in said arm so as to be adjustable. The arm 53 is secured on a vertical rod 57, see Figs. 5 and 10, said rod being vertically movable in the hollow column 19 carried by the table, as heretofore explained. Said column 19 is supported on said table by an annular shoulder 59 and bolts therethrough, not shown. Said rod 57 is elevated by an inclined track 60, see Fig. 1, mounted on the base by means of uprights 61. The track is at the front or gathering side of the machine and when it elevates the rod 57, the bottom 26 will be moved up to close the lower end of the press mold, as seen in Fig. 5. There is a ball 62 on the lower end of the rod 57 for traveling on said track.

Figures 10, 11, 12, 13, 14:
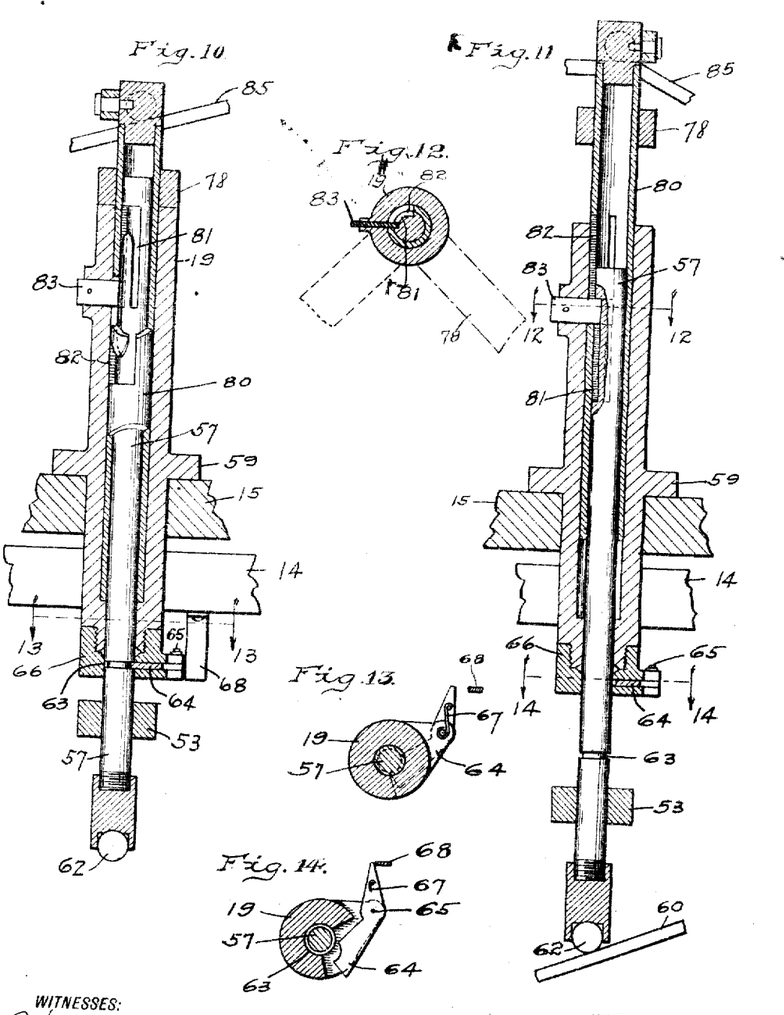
Fig. 10 is a vertical section on the line 10—10 of Fig. 5 with the parts broken away and with both ends of the press mold closed.
Fig. 11 is the same as Fig. 10 with the blow head elevated and bottom lowered from the press mold.
Fig. 12 is a horizontal section through the parts on the line 12—12 of Fig. 11.
Fig. 13 is a horizontal section on the line 13—13 of Fig. 10.
Fig. 14 is a horizontal section on the line 14—14 of Fig. 11.
Figures 15, 16:
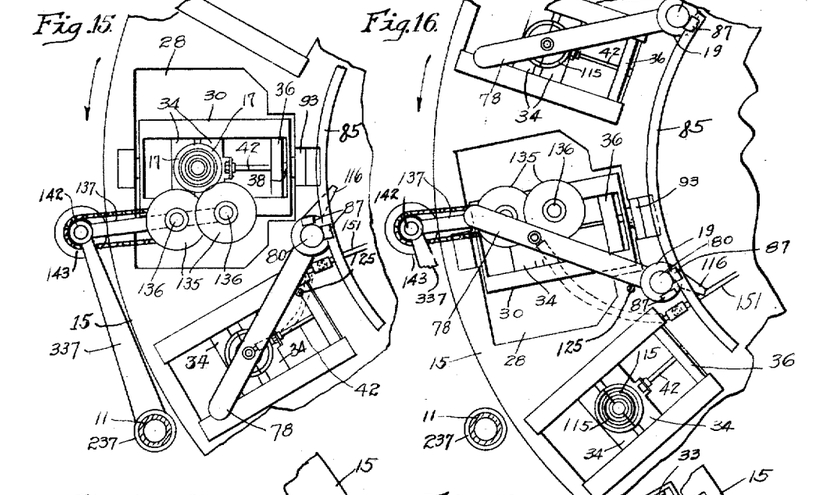
Fig. 15 is a plan view of a portion of the machine showing part of the table and means mounted thereon at the gathering point.
Fig. 16 is the same showing the parts in altered position at the time the gather of glass is being cut off.

When the bottom 26 is elevated to a closing position, it is held and locked in such position by means shown in Figs. 10, 14 and 15. The rod 57 has an annular recess 63 into which the horizontally moving locking plate 64 moves, when the rod 57 is elevated, said locking plate being fulcrumed by a pin 65 in a horizontal slot in a stuffing box 66 screwed to the lower end of the column 19. The locking plate 64 is fulcrumed between its ends and is held closed by a spring 67 and is opened by engagement of the downwardly extending arm 68 from the table support 14, as the table is moved after the blank has been pressed or formed, and when the locking plate is thus disengaged, the rod 57 will drop down by gravity to the positions shown in Figs. 1 and 11.

A plunger 70 is located and operates through the bottom 26 in the lower part of the press mold to press the neck of the blank. It has a plunger rod 71 that extends down through the upright 52 and a ball 73 on the lower end thereof rides upon a track 74 for elevating the plunger to the position shown in Fig. 5. There is a chamber 76 in the bottom to receive said plunger when it is lowered down upon the upper end of the upright 52 so as to hold the end of the plunger flush with the upper end of the bottom, as seen in Fig. 8. The plunger and plunger rod are perforated with a small air conduit, not shown, through which air is supplied from an air tube 177 for assisting in forming the blow opening and chilling it to maintain its form. At the same time that the plunger is operated on the end of the blank, the blank is being forced down into the lower part of the press mold and around the plunger by compressed air being introduced into the upper end of the press mold through a blow head 27. Therefore, the blank is really pressed by the compressed air on top of it and around the plunger rather than being pressed by the plunger as has been common in some forms of glass machines. The blow head 27 is lowered into place on the mold 17 after the gather of glass has been inserted and the press mold has an annular groove 75 which receives an annular flange 76 on the blow head for enabling the blow head to lock the upper ends of the blow sections together.

The blow head 27 is mounted on the lower end of a tubular upright 77 adjustably mounted on an arm 78 by the like means and in the like manner as the upright 52 is mounted in the arm 53 below. The arm 78 extends from a tube 80 vertically reciprocable in the column 19 and with its lower end surrounding the rod 57. The rod 57 has a recess 81 in its upper end and the tube 80 has a slot 82 in it so that a key 83 secured in the column 19 may project through the slot 82 and into the recess 81 and serve to stop and limit the downward movement of the rod 57 and also the upward movement of the tube 80. The blow heads and tubes 80 are elevated by a fixed track 85 held in place by uprights 86 extending down from the top plate 12, as shown in Fig. 1. The left-hand end, as shown in Fig. 1, is inclined upward and at that point a roller 87 on the upper end of the tube 80 travels upward on said track to a horizontal position. The right-hand end of said track is inclined and one of the rollers 87 travels down the same and lets the blow head 27 into the press mold gradually. Compressed air is introduced into the mold through said head by means of an air tube 88 entering the upper end of a tubular lift-over 105 in the upright 77. After the blank is pressed by air coöperating with the plunger, which during the operation is stationary, and the table is moved farther, one of the rollers 87 on the tube 80 comes in engagement with another inclined track 90 secured also to the top frame 12 by uprights 91.

*Turning the press mold.*—After the blank has been pressed and the bottom has been lowered therefrom and the blow head 27 elevated therefrom, and the table moved farther, the press mold is returned from its inverted position shown in Figs. 5 and 6 to the upright position shown in Fig. 7, by an oscillatory movement of the frame 30. Said frame 30, as seen in Fig. 5, has a tubular trunnion 32 which has bearing in a bracket or arm 92 which is secured to the table, as seen in Fig. 5, and extends downward therefrom. The trunnion 32 has also keyed on it a pinion 93 adapted to mesh with a segmental gear 94 secured on an arbor 95 mounted in the lower part of the bracket or arm 92. Said segment is actuated by an arm 96 secured to said arbor 95 and having a roller 97 on its lower end, as seen in Fig. 6, in position to ride upon a track 98, see Fig. 6, which is suspended from the table supporting frame 14 by arms 99. As the roller moves upon said track, it will operate the segment 94 and cause a semi-revolution of the mold which will turn it to its upright position. Later in the operation it becomes necessary to return said press mold from its upright position, as shown in Fig. 7, back to the gathering position, as shown in Fig. 6, and for that purpose, another track 100 is necessary, it being supported from a mold carrying frame 14 by arms or bars 101, and the roller 97 on the arm 96 engages the underside of said track which causes a reverse operation of the segment and a return semi-revolution of the mold.

Figure 2:
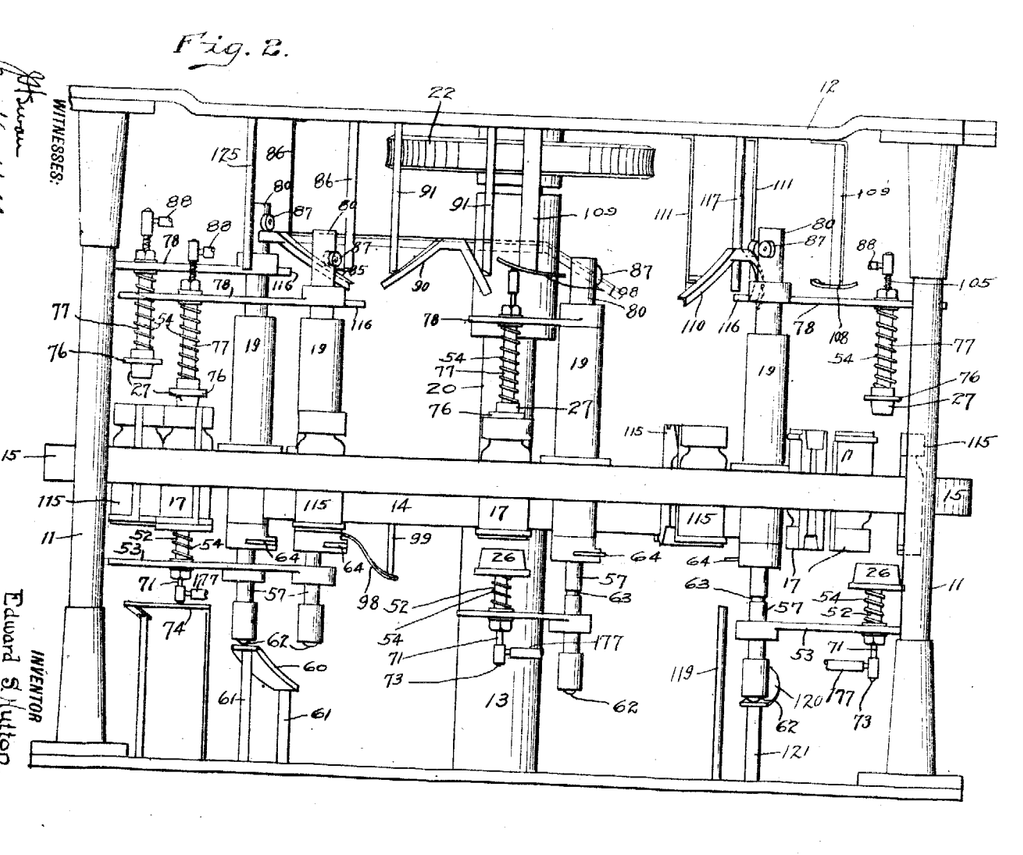
Fig. 2 is an elevation of the right-hand side of the machine, as shown in Fig. 1.
Figure 19:
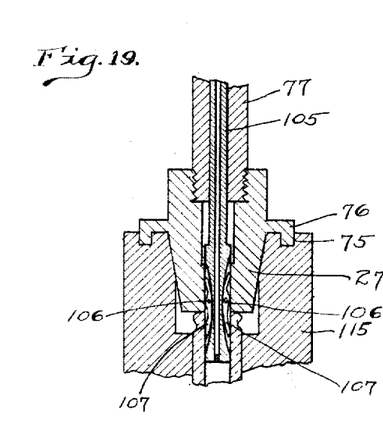
Fig. 19 is a vertical section through the blow head on an enlarged scale.

*Transfer of the blank from the press mold to the blow mold.*—After the blank has been pressed, and the press mold inverted to the position shown in Fig. 7, the blow head 27 is again caused to be sent into what is now the upper end of the press mold and said blow head 27 and tube 77 have in them a tubular lift-over device 105 with the upper end of which the compressed air tube 88 is connected, as seen in Fig. 1, and it is movable independently of the tube 77 and blow head 27 and the lower end is formed in detail, as shown in Fig. 19, with vertical recesses having pivoted in them oppositely located gripping fingers 107. The pivot pins 106 project through longitudinal slots in said gripping fingers 107 so that the fingers can slide down somewhat and as they do so the contracted inner surface of the lower end of the hollow interior of the blow head 27 causes the lower ends of the fingers to spread laterally farther and engage the inner surface of the neck of the blank sufficient to support said blank when the press mold is removed. Said tube 105 and said fingers 107 are inserted or forced downward into the mouth of the blank by a track 108 mounted in connection with the top frame 12 by uprights 109, the underside of which is engaged by the upper end of the tube 105, as shown in Fig. 2. This movement, however, is very slight, being necessary only to have the fingers enter the mouth of the blank sufficiently far to grip the same.

When the lift-over has thus engaged the neck of the blank, as explained, the sections of the press mold are separated by the springs 48 and 49, shown in Fig. 9, the separated portion being shown in the lower right-hand portion of Fig. 9.

Figure 17:
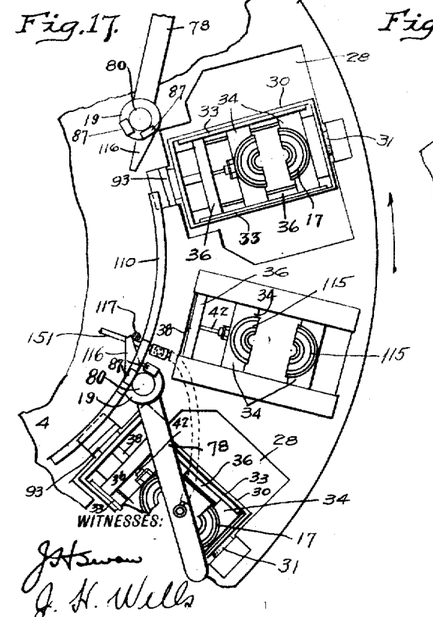
Fig. 17 is a plan view of another part of the table and means mounted thereon preparatory to transferring the pressed blank from the press mold to the blow mold.
Figure 18:
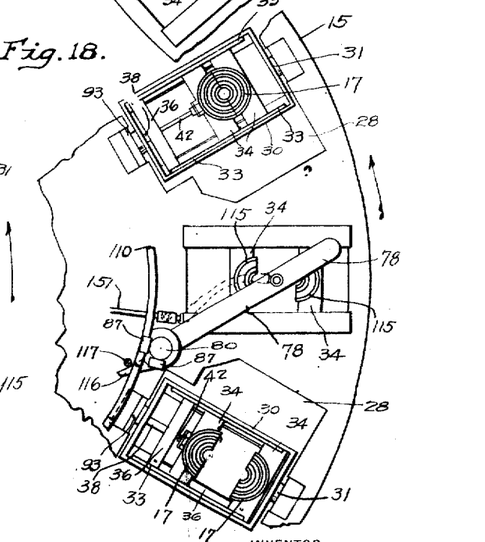
Fig. 18 is the same after such operation has been completed.

At this stage of the operation, therefore, the neck is suspended from the lower end of the tube 105 and is moved slightly upward and laterally from between the sections of the press mold which are now separate. This movement is controlled by a track 110 connected with the top plate 12 by suitable uprights 111 over which one of the rollers 87 on the tube 80 travels, thus lifting the arm 78 which carries the lift-over 105 to enable the blank to clear the table. The blank is then transferred laterally in between the sections of the blow mold 115 which are now separate. This transfer is caused by the oscillatory movement of the arm 78 from the position shown at the lower end of Fig. 17 to the position shown in Fig. 18. This oscillatory movement is caused by an inward projection 116 from an arm 78 coming in engagement with a pin 117 extending down from the top plate 12 while said arm 78 is in its elevated position and the further movement of the table, therefore, will swing said arm to the position shown in Fig. 18. Then the roller 87 on the tube 80 rides down the track 110 and permits the blank to enter the blow mold. That will bring the blow head 27 in closing position with the blow mold, as shown in Fig. 8.

Figure 4:
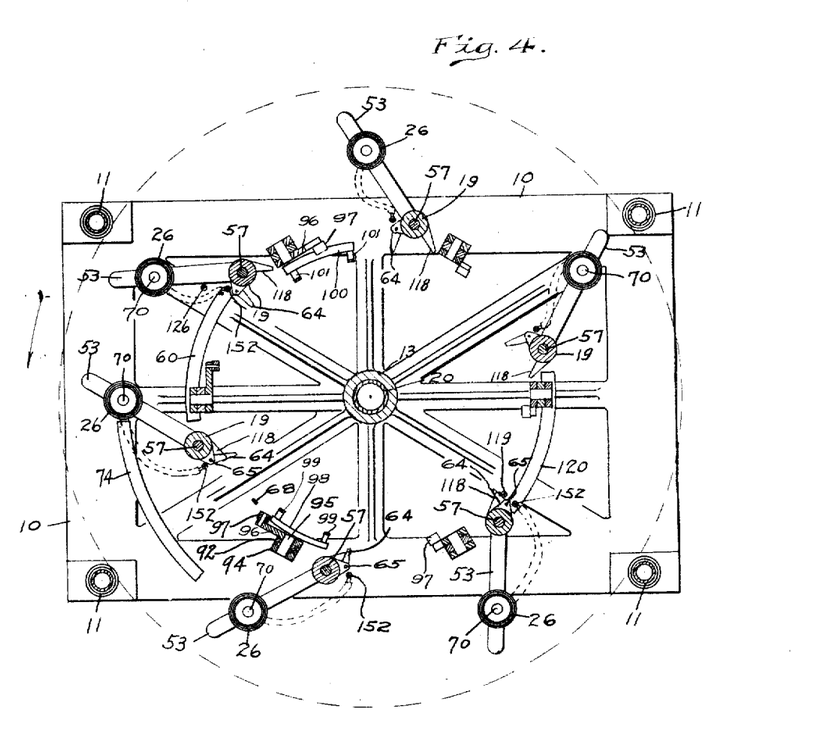
Fig. 4 is a horizontal section on the line 4—4 of Fig. 1.

*Blow mold mounting and operation.*— Each blow mold is composed of two halves and when assembled the mold is open at each end, the upper end being adapted to be closed by the blow head, as shown in Fig. 8, and the lower end by the bottom 26 which was also the bottom of the press mold. The bottom 26 was swung around from the position below the press mold to a position below the blow mold by the oscillatory movement of the rod 57 and arm 53 in the same manner as the tube 80 and arm 78 above. That is, as seen in Fig. 4, there is a projection 118 at the inner end of said arm 53 which engages a pin 119 projecting upward from the base 10 of the machine and this swinging movement of arm 53 occurs while the roller 62 at the lower end of the rod 57 is starting up and traveling on a track 120 mounted on the base by uprights 121 and thus the rod 57 is elevated until it is locked by the locking plate 64 at the time that the bottom 26 reaches closing position in the lower end of the blow mold.

The blow mold is formed of two sections which are mounted in the table by the like means and in the like manner exactly as the press mold excepting that they are not rotatably mounted. After the ends of the blow mold have been closed, compressed air is introduced for blowing the blank into the finished article, as shown in Fig. 8. After the article has been blown, further operation of the table causes separation of the blow mold sections and of the blow head 27 and bottom 26 so that the finished article can be removed or dropped down on a pad, not shown. It is to be observed that the bottom 26 has its upper surface properly shaped to give the desired formation to the bottom of the bottle and that this conformation of the bottom 26 does not interfere with it serving as a bottom also for the press mold, as heretofore explained.

The blow head 27 and bottom 26 and parts in which they are mounted are now returned back to their original position for pressing purposes in substantially the same manner as they were moved from the press mold to the blow mold, excepting that instead of the projection 116 on arm 78 and projection 118 on arm 53 engaging the pins 117 and 119, said arms are engaged by pins 125 extending down from the top plate 12 and the arms 53 are engaged by pins 126 extending up from the base plate 10. These latter pins being outside the fulcrum of the arms 78 and 83, necessarily cause an opposite movement from the pins 117 and 119 which are inside of said circle. In such movement tube 80 is elevated by the track 85 heretofore explained and rod 57 is depressed by arm 68 heretofore described.

Figure 3:
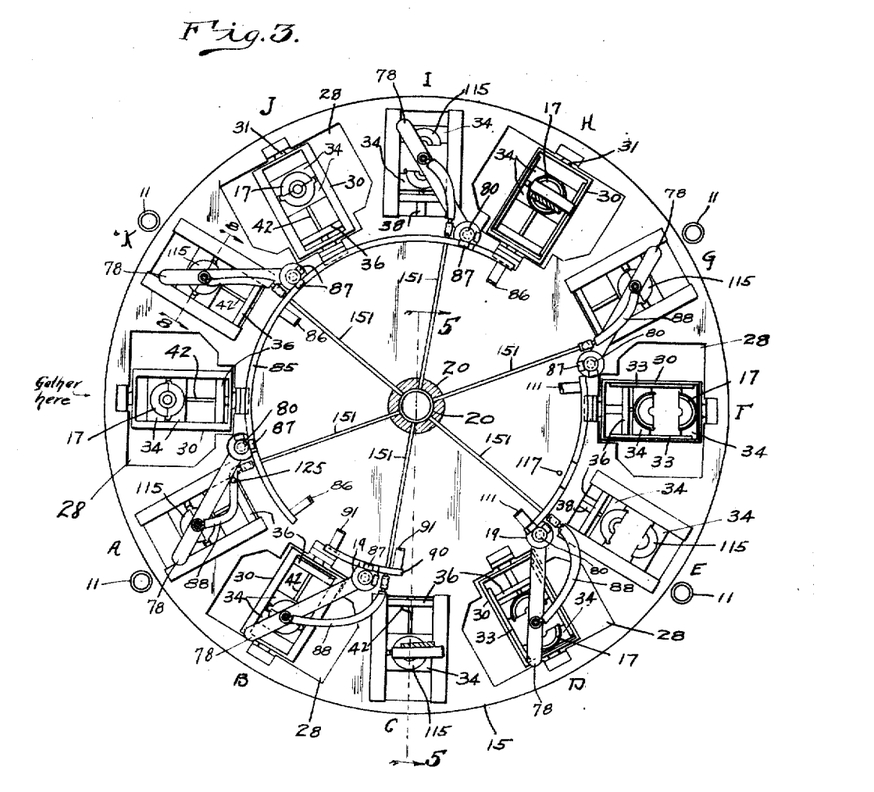
Fig. 3 is a horizontal section on the line 3—3 of Fig. 1.

*Operation.*—The operation has been already explained along with the description of the parts, but a brief statement of the general operation is presented here for making the matter more clear. The glass is gathered and introduced into the press mold at the position indicated at the left-hand side of Fig. 3. As the table moves farther in the direction of the arrow Fig. 4 and by the time the said mold reaches A position, the blow head will have closed down on the upper end of the press blank. By the time said mold has reached the B position, the blank has been pressed and the bottom has been moved downward and the blow head elevated. While said mold then moves to the C position, the press mold is rotated and the blow head has been let down into what is then the upper end of the press mold for engaging the upper end of the blank so as to support it when the press mold is removed. By the time it reaches the D position the mold sections of the press mold are separated and the blank is suspended. While passing to the G position, the blank is transferred from the press mold position to the blow mold position, the press mold at the E and F positions being open. At the G position the blank has been introduced into the blow mold and the blow head is closed at the top of the blow opening and the bottom closed at the bottom thereof and the blowing is commenced and continued to the H position. From the H position to the J position the sections of the blow mold are being opened and the glass article is removed from the I position. While the blow mold is at the I position, the press mold head is at the J position and is being inverted back to its inverted position and when it reaches the K position, the bottom 26 is returned toward the lower end of the mold and when it reaches the gathering position, the bottom entirely closes the lower end of the press mold.

To permit the oscillation of the tube 80 and rod 57 so as to transfer the blank as well as the blow head and bottom, the rod 57 has an inverted U-shaped slot 81, see Fig. 10, into which the key 83 projects. That is, the slot 81 consists of two parallel vertical slots connected at their upper ends with the enlarged opening so that when the rod 57 is in its down position, the key 83 will permit it to oscillate, but when in its upper position the key will be in a lower part of said slot and prevent such oscillation. This latter condition exists when the bottom is closing either a press mold or a blow mold. When it is closing a press mold, the key projects into the near lower portion of the slot, but when the bottom is closing the blow mold the parts are in the position shown in Fig. 10.

The slot 82 in tube 80 is U-shaped, that is, it has two parallel upper extensions, as shown in Fig. 11, and they are connected horizontally at their lower ends. Therefore, when the tube 80 is elevated, it can oscillate, but when in its downward position, it cannot oscillate and thus it is held rigidly in place by the key 83 when the blow head is either on the blow mold or press mold. The horizontal connections between the parallel portions of the two slots 81 and 82 are illustrated in Fig. 12, which shows their relative positions at the time the rod 57 and tube 80 are to be oscillated and in said figure, the positions of the arm 78 in the two positions in which it is oscillated are illustrated by dotted lines.

Figures 21, 22:
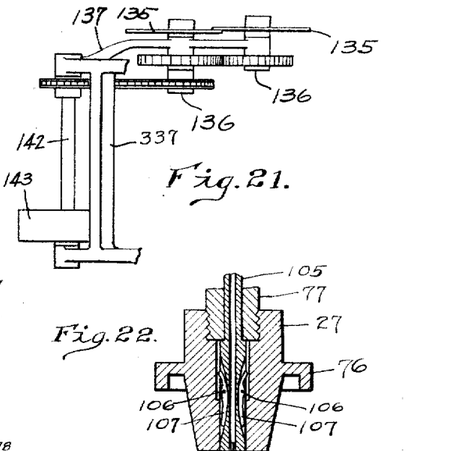
Fig. 21 is a side view of the cut-off mechanism.
Fig. 22 is a vertical section of the blow head, with the lift-over device withdrawn upward into position during the blowing of the article in the blow mold.

The cut-off mechanism for severing the gather of glass which is in the mold from the portion of glass above the mold is shown in plan in Fig. 15 and in front elevation in Fig. 1 and the side view thereof is shown in Fig. 21. It consists of two circular disks or blades 135 mounted in stationary position and overlapping each other and rotating toward each other on the side adjacent the press mold which is in a gathering position so that as the table moves with the gather of glass in the press mold, the glass above the mold will come into engagement with the two cutting disks at their point of overlapping and be severed. These blades are secured on vertical spindles 136 which are rotatably mounted in a horizontal arm 137 on a frame 337 rigidly secured to the column 11, as shown at the right-hand of Fig. 1, by clamps 237 on post 11. The cutting disks are rotated by meshing gears 140 on respective spindles and one of said gears is driven by a chain 141 from a pulley on a vertical shaft 142 which is mounted on said arm 137 and extends downward beside the table and has a friction disk 143 secured thereon which frictionally engages the periphery of the table and is thereby actuated.

Figure 20:
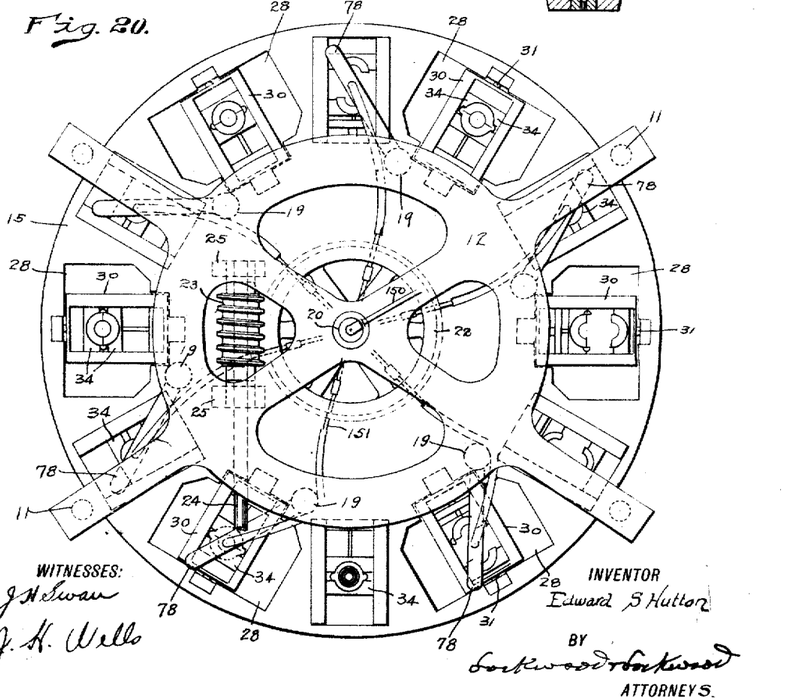
Fig. 20 is a plan view of the machine.

Compressed air is supplied to the air tubes 77 and 88 heretofore referred to from a central tubular column 20 to which compressed air is supplied from some suitable source through tube 150 at the top, as seen in Fig. 20. Air from the column 20 passes through the rigid pipes 151 to the flexible tubes 88 and also to vertical pipes 152 that pass down through the table and connect with the flexible tubes 77.

The tubes 80 have on their upper ends two rollers 87 located at 90° apart so that said tube 80 will be supported by the left hand roller 87 on the track 85 when the blank has been pressed and the other roller will support said tube when the blow mold is being operated. Said tube is oscillated about 90° in transferring the blank from the press mold to the blow mold.

It is to be observed that in this machine hinged molds are obviated and instead the sections of the molds are moved away from and toward each other by cam-shaped springs mounted in the table support, said springs being located where it is desired to open and close the molds. This renders needless springs or other means on the molds, as heretofore, for closing and opening them. Also the press mold in its inverted position, as shown in Fig. 6, has a flaring upper end above the straight portion of the inner surface of said mold which forms the glass. The upper end is flared so as to facilitate the introduction of the gather of glass. This is particularly invaluable in the manufacture of small bottles where it is difficult to insert the gather in the mold on account of the small chamber in it. The upper end of the mold may be flared to any degree desired according to the size of the chamber in the mold.

It is to be noted that the gather of glass need not be elevated to a point above the press mold in order to transfer it therefrom, because the press mold sections separate entirely from each other and, therefore, the gather of glass can be moved laterally from between the sections of the press mold. Likewise in approaching the blow mold the gather of glass need not be carried to a point over the blow mold and move vertically downward, but may be moved laterally in between the blow mold sections before they are brought together.

The invention claimed is:

1. A machine for making hollow glassware including a rotary table, a series of pairs of molds mounted in said table, each pair consisting of a press mold and a blow mold, the upper and lower ends in all of said molds being open, a blow head and a bottom for each pair of said molds, and means mounted in connection with the table for transferring said blow head and bottom from one mold of each pair to the other.

2. A machine for making hollow glassware including a rotary table, a series of pairs of molds mounted in said table, each pair consisting of a press mold and a blow mold, the upper and lower ends in all of said molds being open, a blow head and a bottom for each pair of said molds, and means mounted in connection with the table for transferring said blow head and bottom from said mold of each pair to the other and returning the same during each revolution of the table.

3. A machine for making hollow glassware including a rotary table, a series of pairs of molds mounted in said table, each pair consisting of a press mold and a blow mold, the upper and lower ends of all of said molds being open, a blow head and a bottom for each pair of said molds, and means mounted in connection with the table for simultaneously transferring said blow head and bottom from said mold of each pair to the other and returning the same during each revolution of the table.

4. A machine for making hollow glassware including a rotary table, a pair of press molds and blow molds mounted on said table and open at both ends, a blow head for closing the upper ends of said molds, a bottom for closing the lower ends of said molds, means extending vertically through and mounted in said table for supporting said blow head above the table and bottom below the table, and means for causing the oscillation at the right times of said supporting means for transferring said blow head and bottom from one of said molds to the other.

5. A machine for making hollow glassware including a rotary table, a pair of press molds and blow molds mounted on said table and open at both ends, a blow head for closing the upper ends of said molds, a bottom for closing the lower ends of said molds, means extending vertically through and mounted in said table for supporting said blow head above the table and bottom below the table, and means for causing the oscillation at the right times of said supporting means for simultaneously transferring said blow head and bottom from one of said molds to the other.

6. A machine for making hollow glassware including a rotary table, a pair of press molds and blow molds mounted on said table and open at both ends, a blow head for closing the upper ends of said molds, a bottom for closing the lower ends of said molds, a vertical column extending through and mounted on said table, means adapted to telescope in said column for supporting the blow head and bottom respectively, and means for simultaneously oscillating said supporting means for transferring said blow head and bottom from one of said molds to the other.

7. A machine for making hollow glassware including a rotary table, a pair of press molds and blow molds mounted on said table and open at both ends, a blow head for closing the upper ends of said molds, a bottom for closing the lower ends of said molds, a vertical column extending through and mounted on said table, means adapted to telescope in said column for supporting the blow head and bottom respectively, means for simultaneously oscillating said supporting means for transferring said blow head and bottom from one of said molds to the other as desired, and a stop means in said column for limiting both the vertical and oscillatory movements of said supporting means.

8. A machine for making hollow glassware including a rotary table, a pair of press molds and blow molds mounted on said table and open at both ends, a blow head for closing the upper ends of said molds, a bottom for closing the lower ends of said molds, a vertical column extending through and mounted on said table, a pair of members mounted in said column and one within the other so that they will telescope with each other and having vertical movement in the column, an arm extending rigidly from each telescoping means for supporting the blow head and bottom respectively, and means for causing first a vertical movement of said telescoping means and then an oscillating movement thereof in order to move said blow head and bottom simultaneously vertically away from one of said molds and then transferring them from the position over one of said molds to the other mold and then vertically moving the same to bring them in position to close said last-mentioned mold.

9. A machine for making hollow glassware including a rotary table, a pair of press molds and blow molds mounted on said table and open at both ends, a blow head for closing the upper ends of said molds, a bottom for closing the lower ends of said molds, a vertical column extending through and mounted on said table, a pair of members mounted in said column and one within the other so that they will telescope with each other and have vertical movement in the column, an arm extending rigidly from each telescoping means for supporting the blow head and bottom respectively, means for causing first a vertical movement of said telescoping means and then an oscillating movement thereof in order to move said blow head and bottom simultaneously vertically away from one of said molds and then transferring them from the position over one of said molds to the other mold and then vertically moving the same to bring them in position to close said last-mentioned mold, and means causing the return oscillatory movement of said telescoping means.

10. A machine for making hollow glassware including a rotary table, a pair of press molds and blow molds mounted on said table and open at both ends, a blow head for closing the upper ends of said molds, a bottom for closing the lower ends of said molds, a vertical column extending through and mounted on said table, a tube vertically reciprocable in said column and having a U-shaped slot therein, a rod slidably mounted in said column and tube and having a U-shaped slot therein, said tube and rod extending respectively beyond the ends of said column, a key secured on said column which projects into the slots in said tube and rod, arms on said tube and rod for supporting the blow head and bottom, means for reciprocating said tube and rod simultaneously in opposite directions, and means for causing the oscillation of them to bring the blow head and bottom into registry with the said press and blow molds alternately.

11. A machine for making hollow glassware including a rotary table, a pair of press molds and blow molds mounted on said table and open at both ends, a blow head for closing the upper ends of said molds, a bottom for closing the lower ends of said molds, pivotally mounted arms for supporting and transferring said blow head and bottom respectively, stationary means for engaging said arms as they travel with the table and causing their oscillation and bringing them into registry with said molds alternately.

12. A machine for making hollow glassware including a rotary table, a pair of press molds and blow molds mounted on said table and open at both ends, a blow head for closing the upper ends of said molds, a bottom for closing the lower ends of said molds, arms pivotally mounted between their ends for supporting and transferring said blow head and bottom respectively, stationary means for engaging the inner ends of said arms and causing their oscillatory movement in one direction as they travel with the table, and stationary means for engaging said arms outside their pivot points for oscillating them in opposite directions as they travel with the table.

13. A machine for making hollow glassware including a rotary table, a pair of press molds and blow molds mounted on said table and open at both ends, a blow head for closing the upper ends of said molds, a bottom for closing the lower ends of said molds, a vertical column extending through and mounted on said table, means adapted to telescope in said column for supporting the blow head and bottom respectively, suitably formed and located tracks for vertically reciprocating said supporting means as desired, and means for causing the oscillation of said supporting means when the blow head and bottom are disengaged from said molds for transferring the same from one of said molds to the other.

14. A machine for making hollow glassware including a rotary table, a pair of press molds and blow molds mounted on said table and open at both ends, a blow head for closing the upper ends of said molds, a bottom for closing the lower ends of said molds, a vertical column extending through and mounted on said table, means adapted to telescope in said column for supporting the blow head and bottom respectively, suitably formed and located tracks for vertically reciprocating said supporting means as desired, and means for causing the oscillation of said supporting means when the blow head and bottom are disengaged from said molds by transferring the same from one of said molds to the other, said tracks being arranged so that the bottom of the press mold will be closed in advance of the closing of the upper end thereof so that the gather of glass can be inserted before the blow head is brought down upon the mold.

15. A machine for making hollow glassware including a press mold, a blow mold, a lift-over insertible within the press mold and into the neck of the blank about which the neck of the blank is formed and with its side provided with downward and outward inclinations, and means slidably mounted on said lift-over so as to move downward on said inclinations and spread and engage the inner surface of the neck of the blank so that it will be supported by said lift-over.

16. A machine for making hollow glassware including a rotary table, a table support having an annular channel therein, a mold formed of two vertical sections, radially slidable frames in said table for carrying said sections, rods extending radially inward from said frames, blocks secured to and extending downward from the inner end of each rod, and two successive sets of spring cams secured in the channel of the table support in position to engage said blocks, the spring cams of one set converging so as to bring the mold sections together and the spring cams of the next set formed so as to cause the separation of said mold sections.

17. A machine for making hollow glassware including a table, a table support having an annular channel therein, a mold formed of two vertical sections, a main mold supporting frame with trunnions mounted in said table so as to be rotatable on a radial axis, means for slidably mounting the mold sections in said frame, a frame slidably mounted in said main frame to which one mold section is secured, a tube extending from said frame radially to a point over the channel in the table support, means for mounting the other mold section slidably in said frames, a rod extending from said last-mentioned means through said tube and beyond it to a point over the channel in the table support, blocks secured on the inner ends of said tube and rod, a pair of spring cams in said channel for engaging said blocks and uniting the mold sections as the table revolves, another pair of spring cams in said channel for engaging said blocks and separating the mold sections as the table revolves, means for causing the rotation of said main frame a half revolution when the mold sections are together, and means for causing their return half revolution thereof when the mold sections are apart.

18. A machine for making hollow glassware including a press mold having a blank chamber, the lower end reduced to form the neck of the blank and with a recess below said blank chamber in the lower end of said mold, a bottom for closing said recess in the lower end of the mold and having a central opening thorugh it and an annular depression in the top thereof surrounding said opening, a plunger in the opening through the bottom and of the same diameter, means for elevating the plunger for forming a blow opening in the blank, a stop for limiting the downward movement of the plunger so that its upper end will be flush with the upper surface of the bottom and will close the opening through the bottom, a blow mold having a similar recess in the lower end thereof to the recess in the lower end of the press mold and adapted to receive said bottom so that the upper surface of said bottom will give the desired shape to the bottom of the blown article, and means for transferring said bottom from one mold to the other.

19. A machine for making hollow glassware including a press mold having a blank chamber, the lower end reduced to form the neck of the blank and with a recess below said blank chamber in the lower end of said mold, a bottom for closing said recess in the lower end of the mold and having a central opening through it and an annular depression in the top thereof surrounding said opening, a plunger in the opening of the bottom and of the same diameter as said opening, a plunger rod extending downward therefrom, a tubular upright supporting said bottom and limiting the downward movement of said plunger so that the upper end thereof will be flush with the upper surface of the bottom, a blow mold with the lower end thereof provided with a recess similar to the recess in the lower end of the press mold and adapted to receive said bottom and shape the lower end of the blown article, an oscillatory arm for supporting said tubular upright, and means for oscillating said arm for transferring the bottom from one of said molds to the other.

In witness whereof, I have hereunto affixed my signature.

EDWARD S. HUTTON.